United States Patent [19]

Lewis

[11] 3,877,101

[45] Apr. 15, 1975

[54] THERMOPLASTIC RUBBER FOOTWEAR

[75] Inventor: A. Beverley Lewis, Auburn, Maine

[73] Assignee: Bonan Footwear Company, Inc., Auburn, Maine

[22] Filed: July 22, 1974

[21] Appl. No.: 490,254

[52] U.S. Cl. .................................. 12/142 RS
[51] Int. Cl. .................................. A43d 9/00
[58] Field of Search ........ 12/142 R, 142 E, 142 RS; 36/14

[56] References Cited
UNITED STATES PATENTS

| | | | |
|---|---|---|---|
| 3,247,537 | 4/1966 | Winkler | 12/142 RS |
| 3,345,664 | 10/1967 | Ludwig | 12/142 RS |
| 3,416,174 | 12/1968 | Novitske | 12/142 E |
| 3,444,572 | 5/1969 | Broughton | 12/142 E |

*Primary Examiner*—Patrick D. Lawson
*Attorney, Agent, or Firm*—Sewall P. Bronstein; David G. Conlin

[57] ABSTRACT

Shoes having thermoplastic rubber components preferably a sole and/or a foxing strip, are made by reducing the size of thermoplastic rubber in a manner whereby thermal degradation is minimized, preferably in high shear/low impact size reduction equipment. The resulting material is dry blended with plasticizers, fillers, etc., and is thereafter formed, preferably by direct injection molding into integral contact with the shoe upper.

12 Claims, No Drawings

THERMOPLASTIC RUBBER FOOTWEAR

BACKGROUND OF THE INVENTION

This invention relates to shoe manufacture, especially to the manufacture of shoe components, more particularly direct injection molded shoe soles, from thermoplastic elastomeric rubber materials.

The use of elastomeric materials such as natural or synthetic rubber in the manufacture of shoe components such as show soles has long been known. Such materials have high coefficients of frciton and ground-gripping properties and are very flexible at low or ambient temperatures. However, they are relatively costly and time-consuming to produce. Generally they must be compounded to include expensive vulcanization agents, and they must be mixed with those agents in apparatus which requires a great deal of power, formed in the desired shape, and attached to the shoe upper, and subjected to sufficient heat of a sufficient amount of time so that vulcanization takes place, after which the formed articles are allowed to cool.

Thermoplastic materials, such as polyvinyl chloride, have been used instead of the elastomers, since they can be made comparatively economically and quickly, as by extrusion or injection molding techniques. However, such materials generally suffered from the disadvantages that they become slippery when wet, and they are stiff in cold weather.

There has been developed in recent years a number of block polymers which embody elastomeric polymer chains, such as polybutadiene chains, which are reinforced, or in effect cross-linked, by non-polymeric, e.g., polystyrene, segments or "domains." Such materials have the advantage of most of the valuable properties of natural or synthetic rubbers, but do not require vulcanization. These materials include those sold under the trademark KRATON by Shell Chemical Company, under the trademark SOLPRENE by Phillips Petroleum Company and under the name TPR Thermoplastic Rubber by Uniroyal Chemical Division, and are hereafter referred to as thermoplastic rubber. Unlike natural or synthetic rubber, they can be injection molded, and there is no need for maintaining vulcanization reaction conditions after forming.

While because of their beneficial characteristics these thermoplastic elastomers have found ready acceptance, in the shoe industry, particularly the cloth shoe industry, there remained a number of problems in using them to manufacture shoes. These materials of the type used in shoes are generally supplied either in the form of solid bales weighing about 50 pounds, which have to be compounded with fillers, extenders, colorants and/or other materials on in pellets in which they have already been compounded by the supplier. This compounding has generally been accomplished in a kneader mixer, most often a Banbury mixer, which is a heavy-duty-machine comprising two or more rotors having offset blades which closely follow the generally cylindrical walls of portions of a mixing chamber. The mixing/kneading action takes place in a small space between the rotors and the walls of the mixing chamber. See Perry, Chemical Engineers Handbook, 19-32 (4th ed. 1963). These machines consume large amounts of power and great amounts of heat are generated. Also the running of such kneading mixers requires a substantial amount of manpower. The compounded product which is produced by the kneading mixer is not in the form which is generally usable in the injection molding equipment used in the shoe industry, and must be pelletized prior to being fed to the injection molder. This is usually accomplished by breaking up the product of the kneading mixer on a mill, such as a sheeting mill, which also requires a substantial amount of power input and manpower. This compounded mixture which has thus been reduced in size is then fed to an extruder, and extruded into pellets, which are thereafter cooled. The shoe manufacturer must bear the costs of this wasteful and inefficient pelletizing system, whether he does his own compounding and pelletizing, or merely buys the pre-compounded pellets from his supplier.

In making soles for footwear, especially footwear having cloth or fabric uppers, the compounded pellets are fed to an injection molding machine. Such machines may be of the reciprocating screw type, or the fixed screw (and ram) type or other types which are well known in the art. In the injection molders, the pelletized material is melted by heat and machine energy and injected into a mold under pressure. While in the mold it is cooled to solidification and the molded product may then be removed from the mold. Often the machines used in the shoe industry are rotary machines, with different operations, e.g. injecting, cooling, removing, taking place at different stations. So called "two-color" machines are used often in the shoe industry where it is desired to form two molded parts of the same shoe with different colors or different materials. One such instance is where it is desired to have a sole of one color material and a foxing strip, or side wall, and toe cap which is another color or material. The two-color machine may be one which is similar to a standard injection molder but has two injection units instead of one, which may inject simultaneously or alternatively. Rotary two-color machines may typically have between 2 and 12 stations. Other suitable types are known in the art.

Thus for example a two-color machine may have four stations with casting of the shoe upper over the metal shoe form and placement in the mold taking place at the first station, injection of the first material to make the foxing strip and toe cap, and molding those components to the upper taking place at the second station, a first cooling period taking place in the third, injection of a seond material to make the sole, and a second cooling period to solidify the sole taking place at the fourth and with the opening of the mold taking place as the mold is rotated from the fourth to the first station. It is easily seen that the production rate for the multistation rotary machine as for all other types, is governed by the amount of time required for the longest of the stations involved, which is generally a station at which the cooling portion of the injection cycle takes place.

It is an object of this invention to provide an improved method of manufacturing shoes and shoe parts, utilizing thermoplastic rubbers, more particularly manufacturing direct injection molded footwear with thermoplastic rubber soles and canvas or other cloth uppers. It is a further object to provide a process for utilizing such thermoplastic rubber materials in shoe manufacture which requires substantially less power than previous processes. It is a further object of this invention to provide a process for utilizing thermoplastic rubber materials in shoe manufacture wherein the thermal and mechanical degradation of those materials is decreased as compared to previous processes. It is a further object to provide a process for utilizing such materials in shoe manufacture whereby the time required for preparation of the feed material for the forming machines, e.g. injection molding machines, is substantially reduced, and such preparation requires substantially less manpower, as compared with previous processes. It is still a further object of the present invention to provide a process for utilizing thermoplastic rubber materials in shoe manufacture, whereby a feed for the forming machines, e.g. injection molding machines is produced which requires a substantially shorter cycle time on those machines, as compared with prior processes. It is a still further object to provide improved direct injection molded thermoplastic rubber soled footwear, having better properties, including adhesion to the upper, tensile strength and abrasion resistance.

Other objects and advantages obtained through the present invention will be apparent to those skilled in the art upon consideration of the present disclosure or from practice of the invention disclosed.

Briefly these advantages are obtained through a series of steps wherein the thermoplastic rubber is granulated to a rather small size in a manner which minimizes thermal and mechanical degradation, dry blended with other compounding materials in a high intensity mixer, or other suitable device, and the resulting product is formed into shoe soles in the standard manner, e.g. by injection molding. Particular advantages are obtained if the thermoplastic rubber product is directly molded to the cloth upper to form a complete shoe with the thus-formed thermoplastic rubber sole integral with the cloth upper.

In the first step, it is important to effect the size reduction in such a manner as to minimize the possibility of thermal and mechanical degradation or other adverse effects. Preferably, this is done by granulating the elastomer in a high shear, low impact rotary cutting granulator, such as those sold by Cumberland Engineering Co., Entoleter, Inc., Amacoil Machinery, Inc., and Metalmecconica Plast. S.A. of Italy, and others which are known in the art. With this type of machine, in spite of the high elasticity of the feed, the temperature build up experienced during granulating is minimal. The type sold by Amacoil Machinery, Inc. is presently preferred.

The thermoplastic rubber is reduced to a particle size of below three-sixteenths of an inch, preferably from one thirty-seconds to three-sixteenths most preferably from one-sixteenth to one-eighth inch. The more effective sizes are generally the smaller, since these present the largest surface area for absorption of plasticizers or other liquid materials in the compounding step. On the other hand, the benefits to be gained by increased surface area become outweighed by the time and economics involved in reducing to extremely fine particle size. Also, materials handling problems ensue, such as dusting, both in feeding the reduced size thermoplastic elastomer particles to the apparatus used for compounding, and, in some cases, in feeding the compounded material to the injection molding apparatus. While it is normally unnecessary where the preferred equipment is used, the temperature in the size reduction equipment should be controlled so that it doesn't go above 150°F. While not wishing to be bound by theory, it is believed that excessive temperatures in the previously used kneading mixers are responsible for the inferior setting rate and other extrusion characteristics exhibited as compared with the presently produced materials. One possible reason for the adverse effect is the partial destruction of the polystyrene islands or domains, for example, in the polybutadiene-polystyrene thermoplastic elastomers by excessive mechanical and thermal degradation.

The next step of the process of the present invention is the dry blending (also known as dry mixing) of the suitably prepared thermoplastic elastomer particles with fillers, oils, resins, plasticizer, and other materials which may be added to the elastomers to modify properties and/or to reduce the cost. Dry blending as a process is known, and has been used with other thermoplastic materials, such as polyvinyl chloride, in shoe manufacture. However, it was believed that dry blending could not be used with the thermoplastic rubber materials, since it would be extremely difficult to granulate such materials to the degree necessary to dry blend with results acceptable in this industry. It has surprisingly been found that the entire dry blending process in accordance with this invention actually requires less time than comparable dry blending of polyvinyl chloride compositions, that the product produced from such dry blending sets much more quickly and generally performs better in injection molding than the pelletized thermoplastic elastomer materials manufactured in the standard, much more expensive way, and the footwear embodying the soles thus produced exhibit much improved properties, especially increased adhesion or bonding between the thermoplastic rubber sole and the cloth upper, and improved physical properties, including higher tensile strength and higher abrasion resistance, as compared with footwear embodying thermoplastic rubber soles of the same composition made in the standard way. In using the process of the present invention, only about one half of the manpower and about one tenth the horsepower of that required in the standard pelletizing system are used to produce the same production rate in pounds per hour of compounded thermoplastic rubber feed for the injection molders. At the same time, the improved setting time and other forming properties of the compounded thermoplastic rubber feed of the present invention allow a reduction of from 5 to up to 11 or 12 seconds in the injection molding cycle. Thus, for example an operator of a typical four station two-color injection molding machine can turn out a completed basketball type sneaker with a thermoplastic rubber sole in accordance with the present invention, and a different colored foxing strip, every 28 – 30 seconds, as compared to 35 - 40 seconds presently, an increase in production rate of about 10 to 25 percent. Further, because of the quicker setting times of the thermoplastic elastomerics produced in accordance with the present invention there are fewer rejects in two-color systems caused by the first color "breakthrough" to the second.

As contrasted with previously used compounding techniques, wherein the thermoplastic elastomer is formed into a homogeneous plastic mass containing the fillers, plasticizers, etc., the dry blending process comprises intimately mixing the ingredients with the dry materials in particulate form and, results in heterogeneous mixtures of all components, with the liquids being absorbed in the polymer granules and the other dry powder.

The dry blending takes place preferably in a high intensity mixer, such as the German Henschel or Pappenmeier types, better known as the Welex or Prodex machines, respectively, in the United States, although other suitable apparatus is known in the art.

Generally the ingredients other than the oils are added in the dry state and placed in the mixer, which is started, and the oils are then added. When the friction in the mix raises the temperature to 50° to 60°C, a striking transformation in the nature of the material takes place, from a muddy wet character to a dry, free flowing, granular powder, ideally suited for the injection molding technique of producing shoes. This transformation is believed to be the result of the oils being absorbed completely into the dry powder and the granulated rubber.

A wide vareity of compounding agents or additives suitable for thermoplastic elastomers are well known in the art. Fillers such as clays, silicas, whitings and others often improve resistance to abrasion and crack growth and increase hardness. Oils generally act as plasticizers, with naphthenic and parafinic types being preferred to aromatic oils. Other known plasticizers can also be used. Other resins may advantageously be combined with the thermoplastic elastomeric resin to adjust the properties of the final product. Polystyrene, for example, is useful to adjust properties and is quite compatible with butadiene-styrene block copolymers. The addition of polystyrene generally icnreases hardness, tear strength, abrasion resistance and flex life. Other resins useful alone or in combination with polystyrene are known in the art, and include polyethylene, polyindine, coumarone-indene, pentaerythritol esters of hydrogenated resin, etc.. Other suitable ingredients, such as antitoxidents, stabilizers, etc., are also known in the art.

While elevated temperatures tend to aid the absorption of the oils into the elastomer and thus speed the dry blending step, care should be taken that the temperature not be allowed to rise too high. Normally the dry blend is in condition for use long before temperatures would climb to degrading levels, but in any event the temperature should not be allowed to exceed 170°F, more preferably should be maintained below to 150°F.

The invention will be further clarified upon consideration of the following example.

EXAMPLE I

A fifty pound bale of Solprene 475, a thermoplastic rubber made by Phillips Petroleum Company, is comminuted to a particle size of about one-sixth to one-eighth inch on an "Alsteel" rotary cutting granulator, sold by Entoleter, Inc. of New Haven, Connecticut. The elastomer granules are placed in a Wellex high intensity mixer, together with 15 pounds polystyrene, 15 pounds powdered calcium carbonate filler, 0.5 pounds stearic acid for stabilization, 0.188 pounds parafin wax, 0.25 pounds each of LTDP and Ethyl 330 (standard stabilizers used in the art) and 1.75 pounds of titanium oxide white pigment. The mixer is started on slow speed and 10 parts by weight of process oil is added and then the mixer is switched to high speed. The mixture quickly attains a muddy consistency, and the temperature rises due to the friction. When the temperature reaches about 50°C, the transformation in the character of the mix takes place and it becomes dry, free flowing powder.

The resulting powder may be used to form a thermoplastic sole and/or foxing strip (which may include a toecap) in a sneaker, for example, on a four station, two color rotary injection molder. The thermoplastic powder, may be fed to the barrel of the injector positioned at the second station of the apparatus. The cloth, e.g. canvas, upper is placed in the mold at the first station. The mold is then rotated to the second station, and that part of the mold defining the foxing strip and toe cap, if any, of the shoe, is filled under pressure with molten thermoplastic elastomeric composition from the injector at that station. The filled mold is then transferred to station three, where it is allowed to cool and set. Between stations 3 and 4 the sole plate drops and the injectors at station 4 can then fill the void so-formed with the same or a differently pigmented dry blend rubber composition to produce a two colored shoe. The mold is then allowed to cool and set, and the finished shoe is removed from the mold when it returns to the first station.

Other embodiments of this invention will be apparent to those skilled in the art, and it is intended that the specification be considered as exemplary only, with the true scope and spirit of the invention being indicated by the following claims:

I claim:

1. The process of making a shoe having a thermoplastic rubber component, comprising forming small particles of thermoplastic rubber in a manner whereby the said thermoplastic rubber is not substantially thermally degraded, dry blending said small particles with a composition comprising a plasticizer for said thermoplastic rubber to produce a thermoplastic rubber material, and forming the thermoplastic rubber material into the shape of said shoe component.

2. The process of claim 1, wherein the small particles of thermoplastic rubber are formed by reducing the size of larger pieces of thermoplastic rubber in a high shear, low impact granulator.

3. The process of claim 2, wherein the small particles of thermoplastic rubber are less than three-sixteenths of an inch in diameter.

4. The process of claim 3, wherein said small particles are from about one-sixteenth to three-sixteenths in diameter.

5. The process of claim 3, wherein said dry blending takes place in a high intensity mixer.

6. The process of claim 3, wherein said shoe component is a shoe sole, and is formed by injection molding said thermoplastic rubber material directly into integral contact with a cloth upper.

7. The process of claim 3, wherein the shoe component comprises a foxing strip portion and a sole portion, the foxing strip portion being formed by injection molding said thermoplastic rubber material directly into integral contact with a cloth upper.

8. The process of claim 6, wherein said plasticizing composition further comprises a stabilizer for said thermoplastic rubber.

9. The process of claim 6, wherein said plasticizing composition further comprises a thermoplastic non-elastomeric resin.

10. The process of claim 6, wherein said plasticizer comprises a hydrocarbon oil.

11. The process of claim 10, wherein said thermoplastic elastomeric resin comprises a block copolymer of polybutadiene and styrene.

12. A shoe made in accordance with the process of claim 7.

* * * * *